United States Patent [19]

Rastegar et al.

[11] Patent Number: 5,713,129
[45] Date of Patent: Feb. 3, 1998

[54] METHOD OF MANUFACTURING COATED PISTON RING

[75] Inventors: Freidoon Rastegar, Charleston; John S. Winter, Summerville, both of S.C.; Dana E. Richardson, Columbus, Ind.

[73] Assignee: Cummins Engine Company, Inc., Columbus, Ind.

[21] Appl. No.: 649,217

[22] Filed: May 16, 1996

[51] Int. Cl.[6] .................................................. B23P 17/00
[52] U.S. Cl. ................................ 29/888.04; 29/527.4
[58] Field of Search ........................ 29/888.04, 527.2, 29/527.4; 427/423; 277/285

[56] References Cited

U.S. PATENT DOCUMENTS

| | | |
|---|---|---|
| 1,726,714 | 9/1929 | Pepler . |
| 2,905,512 | 9/1959 | Anderson . |
| 3,539,192 | 11/1970 | Prasse . |
| 3,669,461 | 6/1972 | Togami . |
| 3,814,447 | 6/1974 | Prasse et al. . |
| 4,106,782 | 8/1978 | Hyde et al. . |
| 4,176,434 | 12/1979 | Cromwell et al. . |
| 4,323,257 | 4/1982 | Kondo et al. . |
| 4,359,230 | 11/1982 | Bruni . |
| 4,414,284 | 11/1983 | Ebihara . |
| 4,522,412 | 6/1985 | Kubo . |
| 4,522,415 | 6/1985 | Dworak et al. . |
| 4,756,841 | 7/1988 | Buran et al. . |
| 4,999,225 | 3/1991 | Rotolico et al. . |
| 5,151,308 | 9/1992 | Moskowitz et al. . |
| 5,253,877 | 10/1993 | DeBiasse et al. . |

FOREIGN PATENT DOCUMENTS

| | | |
|---|---|---|
| 1257135 | 12/1971 | United Kingdom . |
| 1399997 | 7/1975 | United Kingdom . |
| 1441961 | 7/1976 | United Kingdom . |
| 2079790 | 1/1982 | United Kingdom . |
| 2082203 | 3/1982 | United Kingdom . |

*Primary Examiner*—Irene Cuda
*Attorney, Agent, or Firm*—Woodard, Emhardt, Naughton, Moriarity & McNett

[57] ABSTRACT

A coated piston ring and method of manufacture for internal combustion engines and compressors. The piston ring having a outer peripheral surface that is coated with a thin substantially final finish spray wear resistant coating for contacting the cylinder wall. The material coating is deposited by high velocity oxygen fuel spray apparatus and a sharp bottom edge is lapped thereon for contacting the cylinder wall of the apparatus. The method of manufacturing comprising rotating a plurality of piston rings about a central axis while the high velocity oxygen fuel gun sprays molten coating material thereon. The molten coating material forming a mechanical interlock with the ring blank to produce a substantially final finish spray coating on the periphery of the piston rings.

39 Claims, 4 Drawing Sheets

METHOD OF MANUFACTURING COATED PISTON RING

BACKGROUND OF THE INVENTION

The present invention relates in general to the design and manufacture of coated seals for internal combustion engines and compressors. More particularly, the present invention relates to piston rings having a wear resistant coating on their outer peripheral surface. While one embodiment of the present invention was developed for internal combustion engines and compressors certain application may be outside of this field.

It is well known that a piston and piston ring combination is essential for an efficient compression/combustion process within an internal combustion engine or compressor. Typically an internal combustion engine or compressor includes two general types of piston rings; a compression ring, and an oil scraper ring. One function of the compression ring is for forming a gas tight seal between the piston and the cylinder wall. An ineffective compression ring seal will allow the leakage of gas, generally referred to as "blowby", between the piston and cylinder wall thereby reducing the engine efficiency and life. A typical oil scraper ring prevents the substantial passage of oil into the region above the sealing rings by applying significant pressure against the cylinder wall.

The further industrialization of modern society has driven designers of internal combustion engines and compressors to seek greater power and speed. The increased demand for power and speed has caused many piston ring manufacturers to coat the piston ring bearing face with a wear resistant coating. A multitude of metallic and ceramic wear resistant coatings have been applied to piston ring bearing faces for years. More particularly, for over two decades, plasma spray coatings formulated of metal and ceramic have been utilized to coat the bearing surface of piston rings. Further, the plating of the exterior surface of piston rings with a wear resistant coating such as chromium has been utilized for many years.

An inherent limitation associated with prior plasma sprayed coatings has been that they often have high porosity, low density, poor surface finish and are easily cracked. The added manufacturing steps associated with finishing a plasma sprayed piston ring include grinding, lapping and deburring the peripheral ring surface to obtain the desired parameters such as coating thickness, and surface finish quality. These post coating operations can add significant cost to producing coated piston rings.

A second limitation associated with prior plasma spray coated rings is the difficulty/impracticality of obtaining a sharp bottom ring edge often desired by designers for contacting the cylinder wall. Many prior designers have had ring designs limited by imperfections in the spray coating, such as: a saw-tooth edge on the coating; the presence of voids in the surface created by the removal of large unmelted particles; and substantial porosity in the surface finish. In addition to the significant manufacturing difficulties associated with forming a sharp ring edge, in many instances the frequency of defects in the prior coatings will prevent the inclusion of a sharp bottom ring edge on the piston ring. In many instances the removal of the large unmelted particles and exposed porosity in the coating cannot be rectified in the manufacturing processed.

While the chromium plating of piston ring bearing surfaces has been utilized for many years to extend the ring life, these rings are prone to scuffing when poor lubrication and high temperatures exit. Further, the chromium coating is an environmentally unfriendly material.

Another limitation associated with many prior coated piston ring designs and their method of manufacture is the additional manufacturing steps involved in finishing the ring. A typical piston ring coating process involves rotating a stack of piston rings while a thick wear resistant coating is sprayed on the surface of the rings. The thick coating flows across the piston rings and bridges onto the adjacent rings, thereby joining them together. In order to separate the coated rings from one another they are subjected to a grinding or cutting operation. Further, many prior ring designs include a circumferential groove in the ring blank that is filled with a plasma coating or plating. The ring surface is then ground to expose the ring blank material while the wear resistant coating is left in the groove. Generally, additional manufacturing steps and substantial costs are required to process these rings.

Although prior coated piston rings and their methods of manufacture are steps in the right direction for enhancing internal combustion engine or compressor performance, the need for additional improvements still remains. The present invention satisfies this need in a novel and unobvious way.

SUMMARY OF THE INVENTION

One form of the present invention contemplates a seal for an internal combustion engine or a compressor, comprising: a piston ring having an outer peripheral surface; and a thin final finish spray wear resistant coating covering the outer peripheral surface.

Another form of the present invention contemplates a ring pack for restricting the flow of fluids between a piston and a cylinder wall within an internal combustion engine or compressor, comprising: a first piston ring having an outer peripheral surface; a thin final finish spray coating on the surface for contacting a portion of the cylinder wall, the coating being a high velocity oxygen fuel dense wear resistant coating for achieving slidable sealing abutment with the cylinder wall; a second piston ring having an outer surface with an upper and lower portion, the second piston ring having the thin final finish spray coating on the outer surface; and a sharp ring edge on the lower portion of the outer surface for contacting the cylinder wall.

Another form of the present invention contemplates a method for producing a piston ring having a thin dense wear resistant coating. The method comprising: rotating a plurality of piston rings about a central axis; spraying a molten material on the outer surface of the plurality of piston rings, the spraying produces a final finish coating on the piston rings; and preventing the bridging of the molten material across adjacent piston rings of the plurality of piston rings during the spraying step.

One object of the present invention is to provide an improved piston ring having a wear resistant coating thereon.

Related objects and advantages of the present invention will be apparent from the following description.

DESCRIPTION OF THE PREFERRED EMBODIMENT

Figure 1:
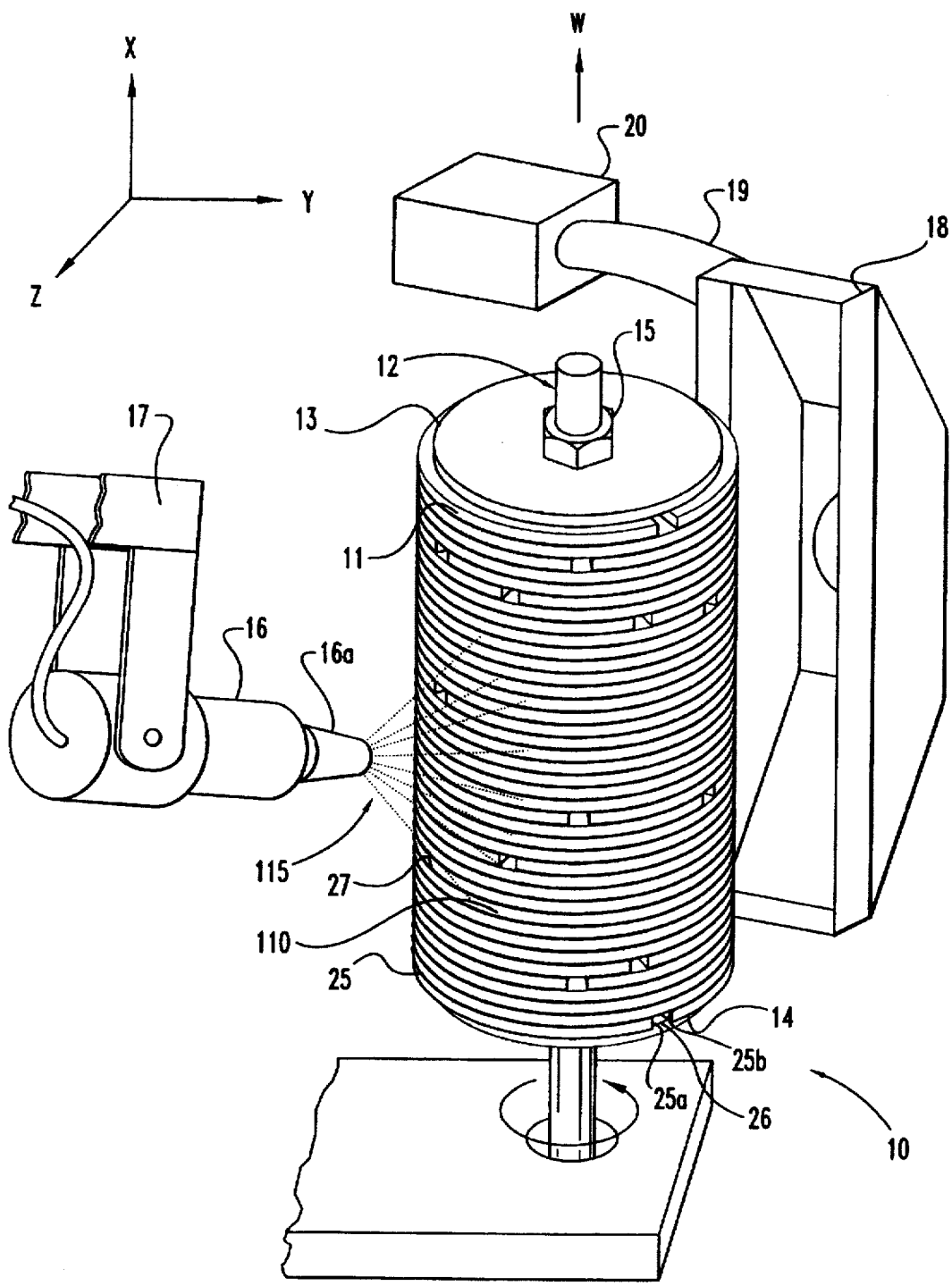
FIG. 1 is a illustrative view of a manufacturing cell for producing a coated piston ring of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a manufacturing cell 10 for producing a plurality of coated seals. In the preferred embodiment the seals are piston rings for an internal combustion engine or compressor. However, other types of substantially rigid seals are contemplated herein. Further, the production of other coated devices such as valve stems, fuel injector components, needles, and plungers is contemplated herein In a preferred embodiment the plurality of piston rings 11 are positioned about a mandrel 12 such that their ring gaps 26 are not aligned. In an alternative embodiment the plurality of piston rings are positioned such that their ring gaps are aligned.

In the preferred embodiment the piston rings 11 are arranged in an abutting relationship one a top another and are processed as a batch, with a batch size being one hundred rings. It is understood that other batch sizes are contemplated by the present invention, and more particularly batch sizes from about one piston ring to infinity are contemplated herein.

The plurality of piston rings 11 being positioned between a bottom plate 14 and a top plate 13, and the assembly being held together by a locking collar 15. The racked plurality of piston rings 11 being rotatable about a central longitudinal axis W by mandrel 12, which is supported by a bearing structure and rotated by a drive mechanism which are generally known to those skilled in the art. It is preferred that the rotational speed of the mandrel be in a range of about 150–400 revolutions per minute, and it is more preferred that the rotational speed be about 400 revolutions per minute. However, the present invention contemplates other rotational speeds herein.

The piston rings 11 are a substantially rigid member and are positioned within mandrel 12 in a normally open position such that there is a normal ring gap 26 between the respective ends 25a and 25b of the piston ring blank. The piston ring being formed from a piston ring blank which is made of metal, metal alloys, and super metal alloys generally known to those of ordinary skill in the art. In an alternative embodiment of the present invention the piston rings 11 are processed in a closed position, such that there is no substantial ring gap between the respective ends of the piston rings. Further, the present invention is applicable to piston rings having no ring gap.

A thermal coating spraying apparatus 16 is positioned relative to the rack of piston rings 11 for delivering a wear resistant coating 110 thereon. In the preferred embodiment, the spraying apparatus 16 is a high velocity oxygen fuel gun. One spraying apparatus of this type is disclosed in U.S. Pat. No. 4,999,225 to Rotolico, and is available from the Perkin Elmer Corporation of Norwolk, Conn. Other high velocity oxygen fuel spraying apparatuses of this general type are available in the marketplace and are known to those of ordinary skill in the art. The thermal spraying process associated with high velocity oxygen fuel guns melts ceramic or metal stock/powder coating. The powder or stock is then fed through the center of the high velocity oxygen fuel gun and the molten coating material is then carried by the high velocity fluid stream to the piston ring for deposition. The high velocity oxygen fuel process delivering the molten coating material to the outer peripheral ring surface 27 at supersonic speed. Delivery of the molten coating material to the piston ring surface at supersonic speeds creates a mechanical interlock between the ring blank and the coating material. It is preferred that the molten material be delivered at speeds in the range of about Mach 2 to Mach 3.

A plenum 18 is spaced from and parallel to the outer peripheral surface 27 of the piston rings 11. The plenum 18 being controllable to deliver a flow of cooling media across the outer surface 27 of the piston rings. In the preferred embodiment a cooling fluid source 20 is connected through a passageway 19 to the plenum 18. The cooling fluid being utilized to cool the piston rings 11 after a coating has been applied thereto. In the most preferred embodiment the apparatus 20 is an air compressor and the cooling media is air. It is understood that other methods of cooling the piston rings are contemplated herein, including but not limited to high thermal conductive chills, and fluid cooled chills.

The high velocity oxygen fuel spray apparatus 16 is connected to a robotic arm 17. The spray apparatus 16 having freedom of motion in three dimensions, which are represented by an X, Y, Z coordinate system. More particularly, the spray apparatus 16 having a spray head 16a that is positionable relative to the outer peripheral surface 27 of the piston rings at an angle of inclination between about 0°–90°. As will be understood by someone of ordinary skill in the art, the angle of inclination and the spacing between the spray gun head 16a and the outer peripheral surface 27 of the piston rings 11 will change parameters of the spray pattern and the associated coating 110. In one embodiment a two degree tapered ring is sprayed at an angle of inclination of fifteen degrees. Further, the gun orientation relative to the outer peripheral surface 27 is also based on the part geometry to avoid bridging of the molten material on adjacent piston rings. In one embodiment of the present invention the spray gun head 16a is held about nine inches from the outer peripheral surface 27 of the piston rings. It is understood that other spacing from the surface 27 is contemplated provided that it delivers the required spray parameter.

Figure 2:
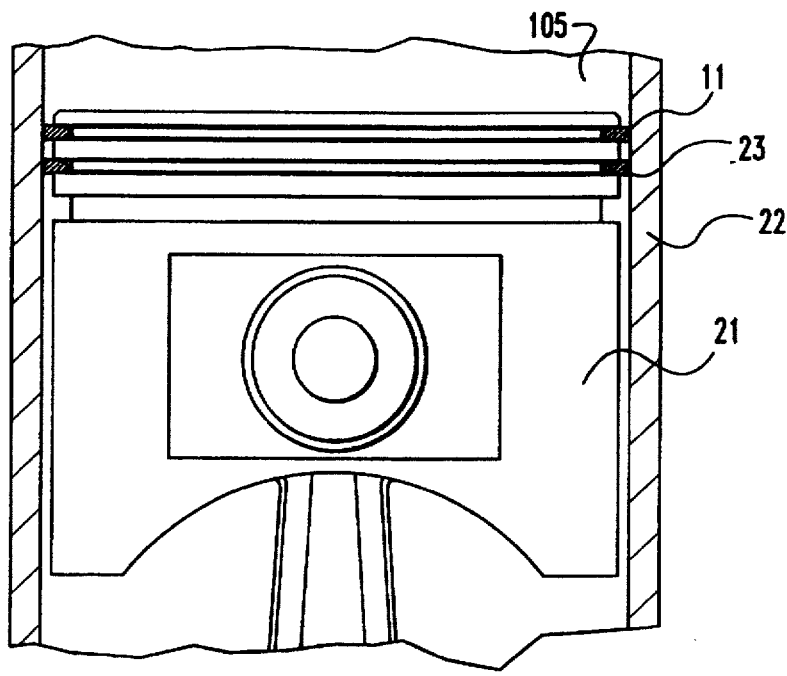
FIG. 2 is a sectional view of one embodiment of a coated piston ring of the present invention positioned between a piston and cylinder wall.

Referring to FIG. 2, these is illustrated a partial cross sectional view of a piston 21 located within a cylinder 105 having a cylinder wall 22. It is understood that the cylinder wall 22 can be integrally cast within a cylinder block or can be an insert cylinder wall sleeve that is placed within an engine block. The outer surface of the piston 21 being spaced from the cylinder wall 22 to allow clearance therebetween. A ring pack 28 comprising a top compression ring 11 and an intermediate compression ring 23 are positioned between the piston 21 and cylinder wall 22. A function of the piston rings 11 and 23 is the restricting of the flow of fluids between the piston 21 and cylinder wall 22. Other ring pack configurations including different quantities and types of compression piston rings and oil scraper rings are contemplated herein.

Figure 3:
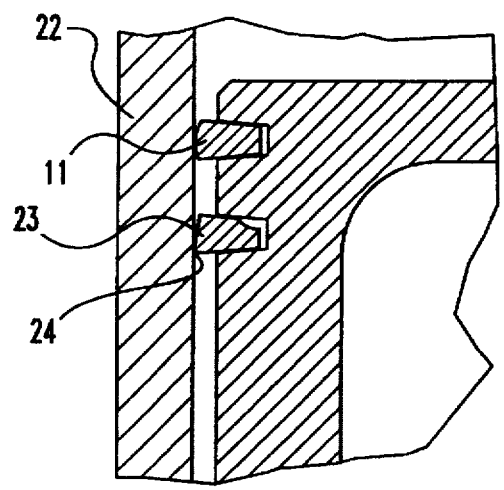
FIG. 3 is an enlarged fragmentary view of the FIG. 2 ring pack.

With reference to FIG. 3, there is illustrated a partial fragmentary sectional view of the FIG. 2 ring pack. In the preferred embodiment the piston ring 23 having a thin uniform final finish spray wear resisting coating covering their outer peripheral surface. While in the preferred embodiment piston ring 11 having a thin uniform substantially final finish wear resistant coating that has been barrel lapped to produce a finer surface finish. Piston ring 11 is barrel lapped to improve the surface finish of the top ring whose function is the sealing of combustion gases. The spray wear resistant coating 110 also having an extremely low quantity of unmelted particles therein and a good surface finish with low porosity. In the preferred embodiment the coating being sprayed by a high velocity oxygen fuel gun 16. In one embodiment the as sprayed final finish coating 110 having a surface finish in the range of about 40–120μ inches. In another embodiment the coating 110 having a surface finish less than 120μ inches. In one embodiment the porosity of the sprayed final finish coating 110 is less than five percent of the cross sectional area of the piston ring coating. The present invention also contemplates inlaid piston rings wherein the coating is sprayed into a groove formed in the piston ring blank.

It is preferred that the wear resistant coating 110 have a thickness in the range of about 0.002–0.006 inches for piston rings with a ring gap. For closed rings (no ring gap) a thickness of less than about 0.015 inches is desired. Further, the coating thickness as sprayed has a uniform thickness within a range of about ±0.001 inches. The outer peripheral surface 27 of the piston rings being positionable in a slidable sealing abutment with the cylinder wall 22 to produce a substantially fluid tight seal.

Figure 4:
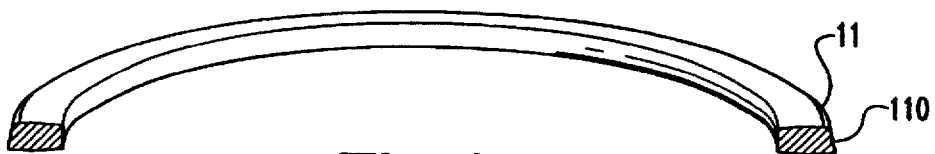
FIG. 4 is a fragmented perspective view of one embodiment of the piston ring of the present invention.

With reference to FIG. 4, there is illustrated a partial perspective view of the coated piston ring 11 of the present invention. The piston ring 11 having a thin uniform substantially final finish spray wear resistant high velocity oxygen fuel coating 110 thereon. The high velocity of the impinging particles 115 onto the piston ring's outer peripheral surface 27 produces highly dense and uniform coatings 110. The coatings applicable for a piston ring include a wide variety of ceramic and metallic materials, however, the coatings discussed below have been found to provide preferred results.

One coating being comprised substantially of molybdenum (Mo) and molybdenum oxide. It is preferred that the percentage of molybdenum oxide in the coating by weight is in the range of about 20 to 40 percent. A second coating having good characteristics is comprised substantially of molybdenum carbide ($Mo_2C$). A third coating is a blend of molybdenum carbide ($Mo_2C$) and molybdenum (Mo). It is preferred that this third coating composition is by weight about 20% molybdenum carbide ($Mo_2C$) and the remainder is molybdenum (Mo). Further, in alternative embodiments of the third coating the composition is about 40% by weight molybdenum carbide ($Mo_2C$) and the remainder is molybdenum (Mo). A fourth coating is a composition of molybdenum carbide ($Mo_2C$), nickel-chrome (NiCr) and molybdenum (Mo). One form of the fourth coating contains by weight about 20% molybdenum carbide ($Mo_2C$), 20% nickel chromium (NiCr) and the remainder being molybdenum (Mo). Further, in an alternative form of the fourth coating the composition by weight is 40% molybdenum carbide ($Mo_2C$), 20% nickel chromium (NiCr) and the remainder being molybdenum (Mo). These coatings are examples of preferred coatings, however they are not intended to limit the coating applied to the piston rings herein.

A more preferred coating is a composition of either a clad, chrome-carbide/nickel-chrome ($Cr_3C_2$-NiCr) coating or a sintered chrome-carbide/nickel chrome ($Cr_3C_2$-NiCr). The coating chemistry by weight in one embodiment is 80% $Cr_3C_2$ and 20% NiCr. A second embodiment having a composition of 75% $Cr_3C_2$ and 25% NiCr, and a further embodiment having a composition of 50% chrome carbide ($Cr_3C_2$) and 50% nickel chrome (NiCr). A most preferred coating is the mixture of the chrome-carbide/nickel chrome ($Cr_3C_2$-NiCr) coatings with molybdenum (Mo). Representation of the coating chemistry is provided below in Table 1.

TABLE 1

Coating Chemistry (weight %)

| | Coatings (Chemistry by Weight %) | | | | |
|---|---|---|---|---|---|
| | A | B | C | D | E |
| Molybdenum | 24 | 50 | 58 | 73 | 100 |
| Nickel | 17 | 15 | 9 | 5 | 0 |
| Chrome | 60 | 30 | 17 | 6 | 0 |
| Others | 0 | 5 | 16 | 16 | 0 |

Figure 5A:
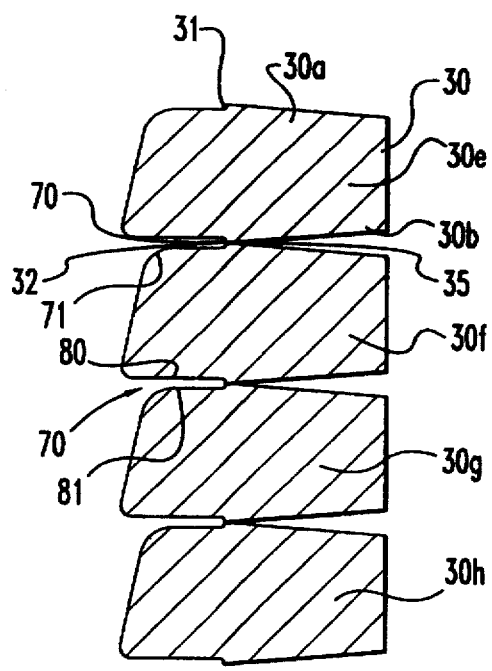
FIG. 5A is a partial sectional view of the FIG. 1 piston ring stack, comprising a stack of piston rings.

With reference to FIG. 5A, there is illustrated a sectional view of a plurality of intermediate piston rings 30 (30e, 30f, 30g, 30h) of one embodiment of the present invention in a racked relation. The piston rings 30 being substantially similar to piston rings 11 and 23. Piston rings 30 having an upper shoulder 31 formed on an upper portion 30a, and a bottom shoulder 32 formed on a bottom portion 30b. Both shoulders 31 and 32 extending uninterrupted around the piston ring 30. The shoulder 31 of a first piston ring 30 mates with the shoulder 32 of a second piston ring 30 at joint 35 to form a blocking structure 70.

The blocking structure 70 defines a substantially annular groove 71 extending between two adjacent piston rings to prevent the spray coating from reaching the joint 35. Blocking structure 70 prevents bridging of the spray coating 110 between two adjacent piston rings. The spray coating that penetrates into the groove 71 impinges upon surfaces 80 and 81 of the adjacent piston rings and therefore no substantial quantity of material reaches the joint 35. Upon completion of the coating process, the piston rings may be readily separated because the joining of adjacent piston rings by the coatings has been substantially eliminated. Thus, the separation process does not require cutting or grinding to separate one piston ring from another and yields no gross coating chipping.

Figure 5B:
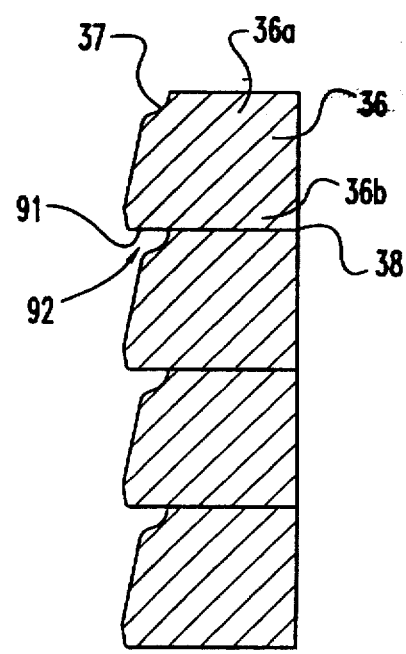
FIG. 5B is a sectional view of another embodiment of the piston ring stack, comprising a stack of piston rings.

With reference to FIG. 5B, there is illustrated an alternative embodiment of the intermediate piston ring 36 of the present invention, wherein the plurality of piston rings 36 are racked similar to the plurality of piston rings 30. Piston rings 36 being substantially similar to piston rings 11 and 23. Piston rings 36 include an upper portion 36a having a relief 37 formed therearound, and a lower portion 36b. Upon positioning the piston rings 36 in a racked relation for spray coating, the relief 37 is disposed adjacent the surface 91 of an adjacent piston ring 36. Surface 91 extending beyond the relief 37 such that it provides an impediment to the flow of material into a groove 92. The physical relationship between the relief 37 and surface 91 of two adjacent piston rings functions to block a substantial portion of the spray coating from reaching joint 38. Joint 38 being the natural separation point between two adjacent piston rings 36. The blocking structure formed by the surface 91, relieve 37 and groove 92 eliminates and/or substantially reduces the deposition of coating material across the adjacent piston rings 36.

Figure 5C:
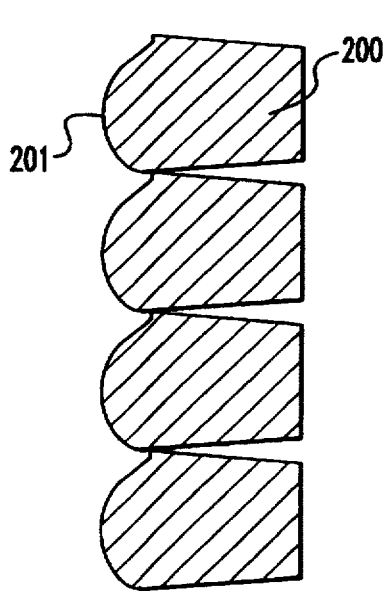
FIG. 5C is a sectional view of another embodiment of the piston ring stack, comprising a stack of symmetric piston rings.

With reference to FIG. 5C, there is illustrated an alternative embodiment of a top piston ring 200 of the present invention, wherein the plurality of piston rings 200 are racked similar to the plurality of piston rings 30. Piston ring 200 being substantially similar to the above disclosed piston rings. The rack of piston rings 200 having a physical relationship as set forth for piston rings 30, 36 for blocking the bridging of coating material across adjacent piston rings. The piston ring 200 having a symmetrical crown 201 (shown exaggerated) for contacting a cylinder wall of an internal combustion engine or compressor. In the preferred embodiment the crown 201 is in the range of about 0.0002 through 0.0008 inches.

Figure 5D:
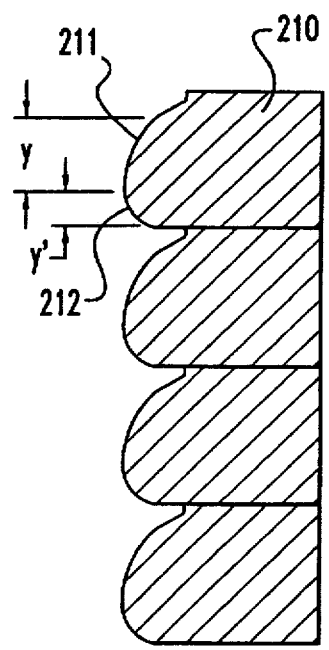
FIG. 5D is a sectional view of another embodiment of the piston ring stack, comprising a stack of asymmetric piston rings.

With reference to FIG. 5D, there is illustrated an alternative embodiment of a top piston ring 210 of the present invention, wherein the plurality of piston rings 210 are racked similar to the plurality of piston rings 200. Piston ring 210 being substantially similar to the above disclosed piston rings. The rack of piston rings 210 having a physical relationship as set forth for piston rings 30, 36 for blocking a substantial portion of the spray coating from reaching the joint between the adjacent piston rings. Piston ring 210 is an asymmetric crowned piston ring, with a portion 211 having a length indicated by Y and a portion 212 having a length indicated by Y'. The length of Y being greater then Y' and in the preferred embodiment Y is about 0.070 inches and Y' is about 0.030 inches. It is understood that other relationships between Y and Y' are contemplated herein to produce asymmetric piston ring.

Figure 6:
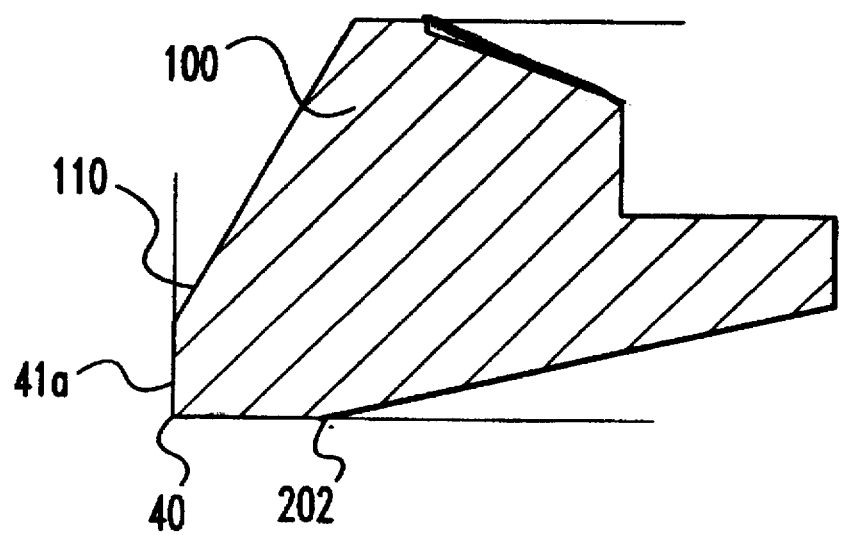
FIG. 6 is a partial sectional view of a piston ring of the present invention having a sharp bottom side edge thereon.

With reference to FIG. 6, there is illustrated a sectional view of another embodiment of the present invention. Piston ring 100 having a sharp bottom side edge 40 extending therearound. Piston ring 100 being substantially similar to piston ring 11 and 23. The outer surface 41a having a sharp bottom side edge 40 coated with the same coating 110 as the outer peripheral surface 41a of the piston ring 100. The feature 40 forming a sharp ring like edge for sliding adjacent the cylinder wall of an internal combustion engine or compressor. In the preferred embodiment surface 202 is left uncoated.

Figure 7:
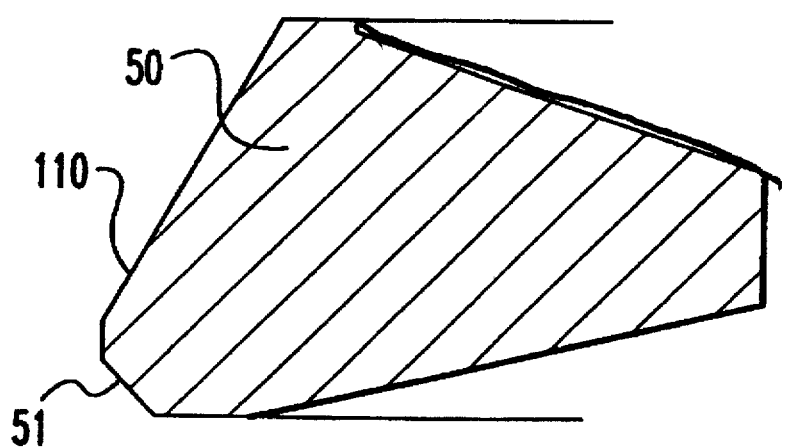
FIG. 7 is a partial section view of a piston ring of the present invention having a bottom side chamfer thereon.

Referring to FIG. 7, there is illustrated another embodiment of the coated piston ring of the present invention. The piston ring 50 includes a sharp bottom side chamfer 51. Piston ring 50 being substantially similar to piston rings 11 and 23. The sharp bottom side chamfer 51 being coated by the same coating material 110 as the outer peripheral surface of the piston ring. The bottomside chamfer 51 contacting a portion of the cylinder wall of the internal compression engine or compressor.

With reference to FIGS. 1–7, an example will now be set forth of a high velocity oxygen fuel process for spraying a wear resistant coating onto a piston ring. A plurality of piston ring blanks are positioned one adjacent another in a racked relation on a mandrel between the top retaining plate and the bottom retaining plate. The racked plurality of piston rings are held in place by a locking structure including a locking collar. The plurality of racked piston ring blanks are rotated about a longitudinal axis W. A high velocity oxygen fuel spray apparatus is held in a spaced apart relationship from the outer peripheral surface of the piston rings. The spraying apparatus being moveable in a plane parallel to the longitudinal centerline, and the apparatus be moved longitudinally during the spraying process.

The high velocity oxygen fuel gun having a flame that is directed onto the outer peripheral surface of the spinning plurality of piston ring blanks to preheat them. Upon reaching a temperature appropriate for the deposition of the selected material the coating material is fed through the high velocity oxygen fuel gun. The longitudinal movement of the spray apparatus/flame is slowed to a speed of 1 inch/second so that the ring blank temperature is elevated into a range of about 150° F.–400° F. A preferred preheating time is in the range of about five-ten minutes. After the preheating phase the piston rings are sprayed with a coating. It is understood that using the high velocity oxygen fuel gun is one technique of pre-heating the piston ring blanks, however other pre-heating techniques are contemplated herein.

The spraying apparatus traverses parallel to the longitudinal axis of the spinning rack of piston rings while spraying the molten coating onto the outer peripheral surface of the rings. In one embodiment a coating having a thickness of about 0.003 inches is obtained by about twenty passes of the spraying apparatus. The spray coating being a final finish spray coating for the intermediate piston rings and a substantially final finish spray coating for the top piston rings. After the piston rings have been coated to a desired thickness the spraying apparatus is shut off and cooling air is discharged onto the outer peripheral surface to facilitate reducing the surface temperature of the piston rings. The continued spinning and discharge of cooling air across the piston rings will reduce the temperature. In many piston ring applications it is desirable to produce a sharp edge on the piston ring. Therefore the plurality of piston rings are removed from the mandrel and a sharp edge or chamfer is lapped thereon. The top piston rings are then subjected to a barrel lap to improve their surface quantity. Further, a deburring process is utilized to remove any burrs remaining on the piston ring. In one embodiment the deburring process is a high energy debur.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for producing a piston ring having a thin dense wear resistant coating, comprising:

rotating a plurality of piston rings about a central axis;

spraying a molten material on the outer surface of the plurality of piston rings, said spraying producing a substantially final finish coating of a substantially as sprayed thickness on the piston rings; and preventing the bridging of the molten material across adjacent piston rings of the plurality of piston rings during said spraying step.

2. The method of claim 1, wherein each of said rings having a material thickness in the range of about 0.002 to 0.006 inches.

3. The method of claim 1, wherein said spraying producing a coating having a surface finish in the range of about 40–120µ inches.

4. The method of claim 1, wherein each of the plurality of piston rings having an upper portion and a bottom portion with an upper shoulder formed on said upper portion and a bottom shoulder formed on said bottom portion, and wherein said preventing includes placing one of the plurality of piston rings in relation with another of the plurality of piston rings so that the upper shoulder of one of the piston rings mates with the bottom shoulder of another of the piston rings to form a blocking structure for preventing the passage of a spray coatings to a joint therebetween.

5. The method of claim 1, wherein each of the plurality of piston rings having an upper portion and a lower portion, the upper portion having a relief formed thereround and the lower portion having a surface extending beyond the relief, and wherein said preventing including placing one of the plurality of piston rings in relation with another of the plurality of piston rings so that the surface extending beyond one of the plurality of piston rings interacts with the relief on another of the plurality of piston rings to form an impediment to the passage of a spray coating to the location where the rings abut one another.

6. The method of claim 1, wherein said preventing includes providing a plurality of piston rings having a structure such that upon placing a pair of rings adjacent one another a blocking structure is formed thereby to substantially prevent the passage of the spray coating to a joint between the abutting rings.

7. The method of claim 6, which further includes providing a high velocity oxgyen fuel gun for performing said spraying.

8. The method of claim 7, wherein said spraying of the coating is at speeds in the range of about Mach 2 to Mach 3, thereby causing a mechanical interlock between the coating and the ring.

9. The method of claim 7, which further includes preheating the piston ring to a temperature appropriate for material deposition thereon.

10. The method of claim 9, wherein said preheating is substantially accomplished by the flame of the high velocity oxygen fuel apparatus.

11. The method of claim 9, which further includes traversing the spraying apparatus along said plurality of piston rings parallel to the central axis of the piston rings, and wherein said rotating comprises a coating mode and a preheating mode, said coating mode having a rotational speed greater than said preheating mode.

12. The method of claim 11, wherein said rotating includes rotating at least one hundred piston rings at once, and wherein said rotating is at speeds of about 150 to 400 revolutions per minute.

13. The method of claim 11, which further includes passing fluid across the piston rings after the coating has been applied thereto.

14. The method of claim 6, which further includes:
providing a high velocity oxgyen fuel gun for performing said spraying and wherein said spraying of the coating is at speeds in the range of about Mach 2 to Mach 3, thereby causing a mechanical interlock between the coating end the ring;
preheating the piston ring while positioned about the central axis to a temperature appropriate for material deposition thereon, and wherein said preheating is substantially accomplished by the flame of the high velocity oxygen fuel apparatus;
traversing the high velocity oxgyen fuel gun along the plurality of piston rings parallel to the central axis, and wherein said rotating comprises a coating mode and a preheating mode, said coating mode having a rotational speed greater than said preheating mode;
passing cooling gas across the piston rings after the coating has been applied thereto; and
separating the piston rings after the coating has been applied, wherein said separating does not involve cutting or grinding in order to separate the rings and yields no gross coating chipping.

15. The method of claim 1, which further includes separating the piston rings after the coating has been applied, said separating does not involve cutting or grinding in order to separate the rings and yields no gross coating chipping.

16. A method for coating piston rings with a thin dense substantially uniform wear resistant coating, comprising:
positioning a plurality of piston rings in racked relation to one another;
rotating the plurality of piston rings about a central axis;
spraying a supersonic spray stream containing a material onto the outer surface of the plurality of piston rings to create a mechanical interlock between the piston ring and the material; and
preventing the joining of adjacent racked piston rings by material bridging between the plurality of piston rings.

17. The method of claim 16, wherein each of the rings having a material thickness in the range of about 0.002 to 0.006 inches.

18. The method of claim 16, wherein each of the plurality of piston rings having an upper portion and a bottom portion with an upper shoulder formed on said upper portion and a bottom shoulder formed on said bottom portion, and wherein said preventing includes placing one of the plurality of piston rings in relation with another of the plurality of piston rings so that the upper shoulder of one of the piston rings mates with the bottom shoulder of another of the piston rings to form a blocking structure for preventing the passage of a spray coatings to a joint therebetween.

19. The method of claim 16, wherein each of the plurality of piston rings having an upper portion and a lower portion, the upper portion having a relief formed thereround and the lower portion having a surface extending beyond the relief, and wherein said preventing including placing one of the plurality of piston rings in relation with another of the plurality of piston rings so that the surface extending beyond one of the plurality of piston rings interacts with the relief on another of the plurality of piston rings to form an impediment to the passage of a spray coating to the location where the rings abut one another.

20. The method of claim 16, wherein said preventing includes providing a plurality of piston rings having a structure such that upon placing a pair of rings adjacent one another a blocking structure is formed thereby to substantially prevent the passage of the spray coating to a joint between the abutting rings.

21. The method of claim 20, which further includes providing a high velocity oxgyen fuel gun for performing said spraying, and wherein said spraying is at speeds in the range of about Mach 2 to Mach 3, thereby causing a mechanical interlock between the coating and the ring.

22. The method of claim 21, which further includes preheating the piston ring to a temperature appropriate for material deposition thereon.

23. The method of claim 22, which further includes traversing the spraying apparatus along said plurality of piston rings parallel to the central axis of the piston rings, and wherein said rotating comprises a coating mode and a preheating mode, said coating mode having a rotational speed greater than said preheating mode.

24. The method of claim 20, which further includes:
providing a high velocity oxgyen fuel gun for performing said spraying and wherein said spraying of the coating is at speeds in the range of about Mach 2 to Mach 3, thereby causing a mechanical interlock between the coating and the ring;

preheating the piston ring while positioned about the central axis to a temperature appropriate for material deposition thereon, and wherein said preheating is substantially accomplished by the flame of the high velocity oxygen fuel apparatus;

traversing the high velocity oxgyen fuel gun along the plurality of piston rings parallel to the central axis, and wherein said rotating comprises a coating mode and a preheating mode, said coating mode having a rotational speed greater than said preheating mode;

passing cooling gas across the piston rings after the coating has been applied thereto; and separating the piston rings after the coating has been applied, wherein said separating does not involve cutting or grinding in order to separate the rings and yields no gross coating chipping.

25. The method of claim 16, which further includes separating the piston rings after the coating has been applied, said separating does not involve cutting or grinding in order to separate the rings and yields no gross coating chipping.

26. A method for coating piston rings with a wear resistant coating, comprising:
providing a plurality of piston rings having a first upper portion and a second lower portion;
positioning the plurality of piston rings in a racked relation to one another so that the first portion of one of the plurality of rings abuts the second portion of another of the plurality of rings;
rotating the plurality of piston rings;
spraying a supersonic spray stream containing a wear resistant coating onto the outer surface of the plurality of rings; and
wherein said positioning step forming a spray impedient for preventing the depositing of coating material in a bridging relationship across adjacent piston rings.

27. The method of claim 26, wherein each of said rings having a material thickness in the range of about 0.002 to 0.006 inches.

28. The method of claim 26, which further includes providing a high velocity oxgyen fuel gun for performing said spraying.

29. The method of claim 28, wherein said spraying of the coating is at speeds in the range of about Mach 2 to Mach 3, thereby causing a mechanical interlock between the coating and the ring.

30. The method of claim 29, which further includes preheating the piston ring to a temperature appropriate for material deposition thereon.

31. The method of claim 30, wherein said preheating is substantially accomplished by the flame of the high velocity oxygen fuel apparatus.

32. The method of claim 30, which further includes traversing the spraying apparatus along said plurality of piston rings parallel to the central axis of the piston rings, and wherein said rotating comprises a coating mode and a preheating mode, said coating mode having a rotational speed greater than said preheating mode.

33. A method for coating piston rings with a thin dense substantially uniform wear resistant coating, comprising:
positioning the plurality of piston rings having a top edge and a bottom edge adjacent to one another in a stacked relation;
rotating the plurality of piston rings about a central axis;
spraying a supersonic final finish spray stream coating onto a peripheral surface of each of the plurality of piston rings, said spraying producing a hard high density uniform coating with extremely low unmelted particles; and
finishing one of said top and bottom edges to a sharp ring edge after said spraying.

34. The method of claim 33, wherein said spraying produces a coating having a porosity which is less than five percent of the cross sectional area of the piston ring coating.

35. The method of claim 33, which further includes providing a high velocity oxgyen fuel gun for performing said spraying.

36. The method of claim 35, wherein said spraying of the coating is at speeds in the range of about Mach 2 to Mach 3, thereby causing a mechanical interlock between the coating and the ring.

37. The method of claim 36, which further includes preheating the piston ring to a temperature appropriate for material deposition thereon, wherein said preheating is substantially accomplished by the flame of the high velocity oxygen fuel apparatus.

38. The method of claim 37, which further includes separating the piston rings after the coating has been applied, said separating does not involve cutting or grinding in order to separate the rings and yields no gross coating chipping.

39. A method for coating piston rings with a wear resistant coating, comprising:
providing a plurality of piston rings having a first upper portion and a second lower portion;
positioning the plurality of piston rings in a racked relation to one another so that the first portion of one of the plurality of rings abuts the second portion of another of the plurality of rings;
rotating the plurality of piston rings;
spraying a supersonic spray stream containing a wear resistant coating onto the outer surface of the plurality of rings; and
blocking the depositing of the coating material via a blocking means for preventing the depositing of coating material in a bridging relationship across adjacent piston rings.

* * * * *

UNITED STATES PATENT AND TRADEMARK OFFICE
CERTIFICATE OF CORRECTION

PATENT NO : 5,713,129
DATED : February 3, 1998
INVENTOR(S): Freidoon Rastegar et al.

It is certified that error appears in the above-identified patent and that said Letters Patent is hereby corrected as shown below:

In Block 56 of the title page, column 2, under "Attorney, Agent or Firm", please change "Moriarity" to --Moriarty--.

In column 1, line 42, please change "haw" to --have--.

In column 2, line 1, please change "exit" to --exist--.

In column 3, line 38, please insert a period after "herein".

In column 9, line 62, please change "end" to --and--.

In col. 11, line 45, please change "impedient" to --impediment--.

Signed and Sealed this

Second Day of June, 1998

*Attest:*

BRUCE LEHMAN

*Attesting Officer*     *Commissioner of Patents and Trademarks*